Figure 1:
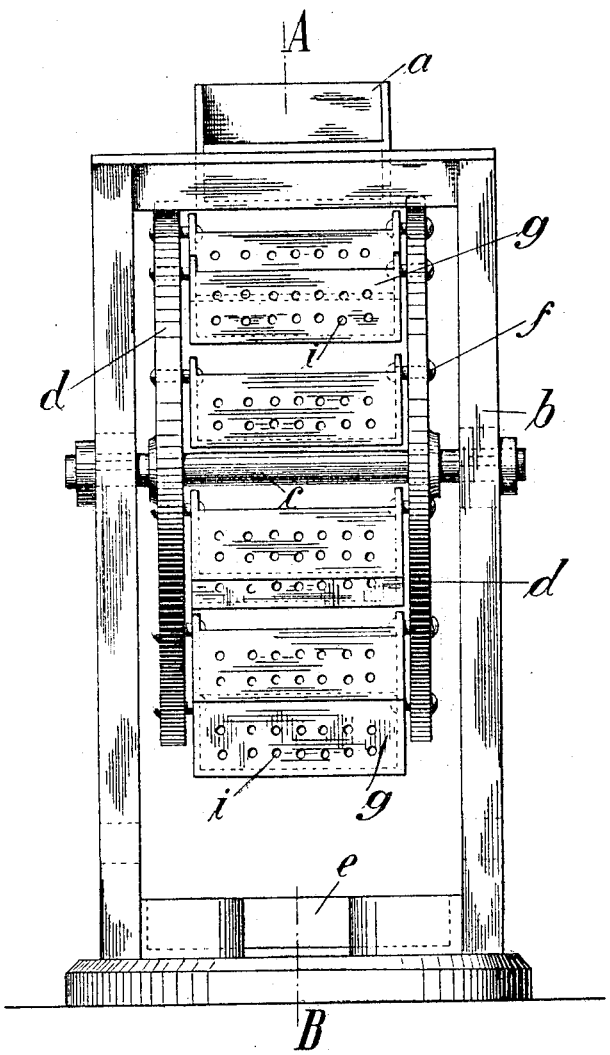

No. 798,908. PATENTED SEPT. 5, 1905.
C. KREMER.
APPARATUS FOR CARRYING OUT BACTERIAL PURIFICATION OF SEWAGE OR DRAIN WATER.
APPLICATION FILED OCT. 22, 1904.

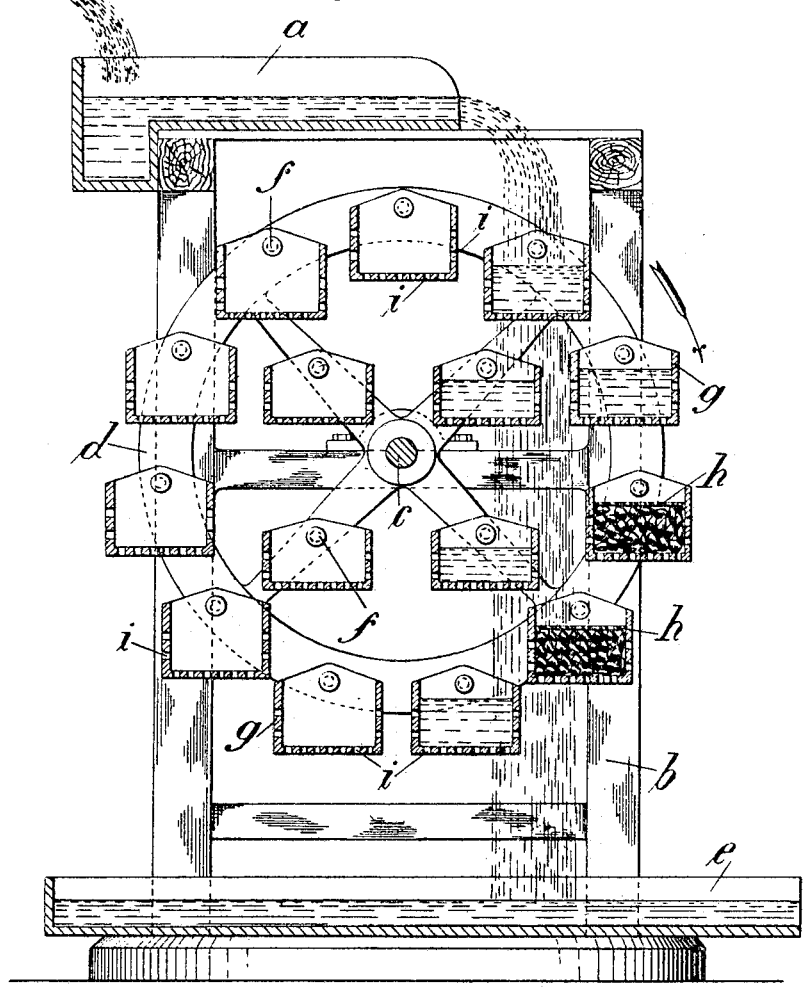

No. 798,908. PATENTED SEPT. 5, 1905.
C. KREMER.
APPARATUS FOR CARRYING OUT BACTERIAL PURIFICATION OF SEWAGE OR DRAIN WATER.
APPLICATION FILED OCT. 22, 1904.
4 SHEETS—SHEET 3.
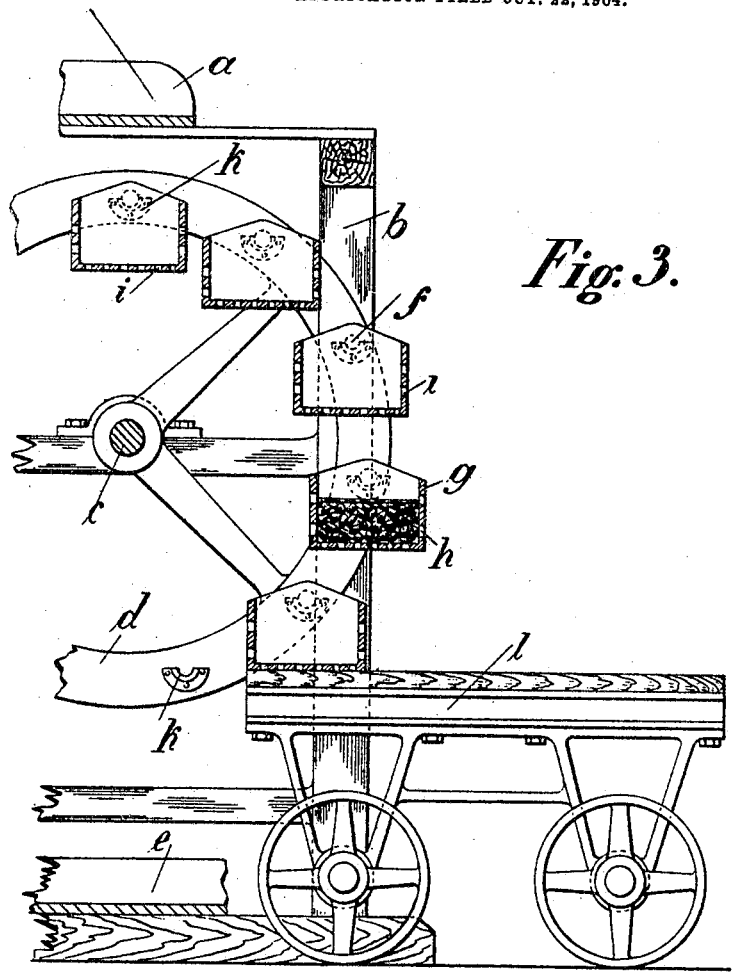
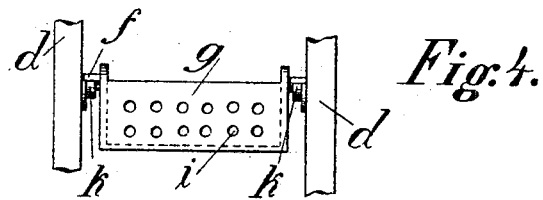

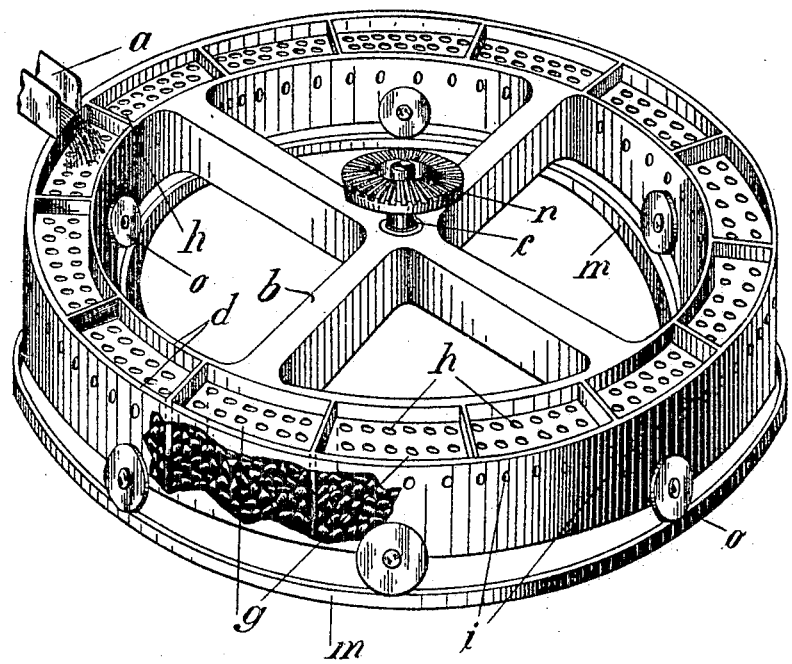

UNITED STATES PATENT OFFICE.

CHRISTOPH KREMER, OF GROSS LICHTERFELDE, NEAR BERLIN, GERMANY.

APPARATUS FOR CARRYING OUT BACTERIAL PURIFICATION OF SEWAGE OR DRAIN WATER.

No. 798,908.        Specification of Letters Patent.        Patented Sept. 5, 1905.

Application filed October 22, 1904. Serial No. 229,587.

*To all whom it may concern:*

Be it known that I, CHRISTOPH KREMER, a subject of the King of Prussia, German Emperor, residing at Kiesstrasse 2, Gross Lichterfelde, near Berlin, Germany, have invented new and useful Improvements in Apparatus for Carrying Out Bacterial Purification of Sewage or Drain Water, of which the following is a specification.

This invention relates to an apparatus for carrying out bacterial purification of sewage or drain water. This process is used, as is well known, for rendering harmless matter suspended in sewage; and it consists in passing the latter through a series of filters, which are ventilated to the greatest possible degree both during the passage of the sewage and to a still greater extent after its discharge. Of the processes which have a purifying effect during the treatment of the sewage apart from the absorption due to the composition of the filtering material, the oxidation of the suspended matter and its destruction by the action of certain bacteria are of special importance. The intensity of the last two actions chiefly depends on the thoroughness and regularity of aeration.

The apparatus illustrated in the accompanying drawings has therefore for its chief object the increasing of this action of air in order, on the one hand, to increase the oxidation of the matter in suspension by supplying oxygen and at the same time to bring about conditions favorable for the development of bacteria and to increase their action by submitting the oxidizing bodies to a strong movement in the air-space.

The apparatus according to this invention comprises, therefore, a rotating wheel or carrier provided at its circumference and its spokes with a number of perforated boxes filled with the usual filtering material—such as coke, slag, or the like—sewage, first roughly clarified and deprived of its coarser particles being admitted into these boxes, so that, if desired, the wheel in question can be driven by the said current of sewage or drain water. As in ordinary water-wheels the water-inlet is arranged, according to the head available, either at the top, in the center, or at the bottom of the circumference, in the case of a very small head it is necessary to use instead of a vertical wheel a horizontal one driven by a separate device. The oxidizing bodies are rotatably and interchangeably suspended at the circumference and upon the spokes of the wheel, so that owing to the movement of the wheel they are always carried in the direction of the rotation of the wheel in the same position. Sewage discharged on the circumference of the wheel drives it and at the same time fills the first filter-box, passes through its perforations, and after having trickled through the oxidizing material is discharged into the box immediately below. At the same time the rotation of the wheel produces a strong current of air, which passes through the perforations of the filter-box, comes into thorough contact with the sewage passing through it, and increases the clarifying action of the filter by increased oxidizing. The air-current produced by revivifying the oxidizing bodies helps to a still greater extent to increase the oxidizing action and to revive the destructive action of the bacteria and to render harmless the matter retained by the filters. The sewage passes from one filtering body to another and is thus subjected to a multiple and thorough purification and is discharged in a perfectly purified state through a canal arranged at the bottom of the wheel.

Figure 1 of the accompanying drawings is a front elevation of a vertically-rotating wheel, Fig. 2 showing the same in vertical section on the line A B of Fig. 1. Fig. 3 shows a construction of the wheel shown in Figs. 1 and 2; and Fig. 4 is a detail view of the same construction, Fig. 5 being a perspective view of a horizontally-rotating wheel.

In the vertical wheel shown in Figs. 1 and 2 a frame *b*, arranged under the water-inlet *a*, is provided with a spindle *c*, supporting the two wheel-rims *d*, between which are rotatably supported by pins *f* perforated framework, or the like boxes containing oxidizing bodies, preferably covered by sieves *h*. These boxes are supported so that under the influence of gravity they always remain vertical, whether during the time they are standing still or rotating. Similar boxes containing oxidizing bodies are rotatably suspended on the spokes of the wheel in such manner that the sewage first entering the boxes suspended at the circumference of the wheel flows after passing through the former into the boxes carried by the spokes before reaching the outlet-channel. These oxidizing bodies consist of some suitable material—such as, for instance, coke—and take up the sewage admitted from the inlet. By falling into the boxes said sewage drives the wheel. Passing through the perforations $i$ of the walls of the upper boxes, the water passes into the boxes immediately below, filled with the same or other suitable material, passes through them in the same manner, and finally reaches the outlet $e$. During that process the sewage leaves in the oxidizing bodies the greater portion of the solid articles it contains. These particles must be destroyed and mineralized by the subsequent action of bacteria and subsequent oxidation. By "mineralized" I mean the process or operation by which the organic nitrogen compounds are decomposed and reduced to simple nitrates. The so-called "nitrogen bacteria" are effective to destroy such organic nitrogen compounds, forming nitric acid, which afterward combines with the mineral substances contained in the water, such as salts of sodium or potassium, forming corresponding nitrates, such as sodium or potassium nitrates. As the sewage or drain water to be purified comes in contact with a large surface of the oxidizing bodies the atmospheric air also comes into a thorough contact with the water trickling through the boxes, so that the aeration of the oxidizing bodies is already a very good one even while they are filled with water. This aeration is not, however, interrupted, for each separate oxidizing body is exposed to the air during the whole time of the rotation of the wheel, and the aerating action in question is the strongest during that period of rotation in which the oxidizing bodies getting out of reach of the descending water move upward empty in order to come again under the jet of sewage driving the wheel. As during such a process the sewage is at the same time subjected to a filtration which results in the pores of the oxidizing bodies getting choked in time, the following proceeding can be adopted in order to avoid the necessity of interrupting the working when changing separate oxidizing bodies. The boxes $g$ are provided with pins $f$, supported in bearings $k$, arranged on the sides of the two rims, facing each other in such manner that by means of, say, a truck $l$, pushed under during the rotation of the wheel, on which truck comes to rest the box coming within its reach, the said box is lifted out of its bearings $k$ and easily replaced by another, Fig. 3. It is preferable to use a series of such wheels which should be alternately driven, so that while in one wheel the oxidizing bodies are filled with sewage and are passing through the air-space only during half the revolution of the wheel in empty state in the other wheel the supply of sewage is shut off, preferably by the excess of power of the first driven wheel, and the emptied oxidizing bodies filled with organic particles are turned through the air-space, whereby a very energetic action of microbes and oxidation are obtained.

The construction in Fig. 5 shows a horizontally-rotating wheel which can be driven by any desired means—such as, for instance, by a capstan of bevel-wheels—and preferably travels by means of rollers on a circular track. The vertical spindle driven by means of a bevel-wheel gear drives the wheel consisting of two rims $d$ and a number of arms $b$. The rims are connected by radial walls, between which are placed the oxidizing bodies $g$. Water sewage to be purified flows through the inlet-chute $a$ from the top into the spaces between the rims. Corresponding to the perforations of the boxes in vertical wheels in the horizontal wheels the two rims are provided with one or more series of perforations serving for the same purpose.

Sewage discharged on the oxidizing bodies must of course be previously deprived of the coarser particles it may contain, the particles not removed by such preliminary purifying being retained by the oxidizing bodies and destroyed in them to the greatest extent by the action of bacteria and oxidation. These two last actions are the more energetic, as the conditions for them are the most favorable possible, owing to the process described.

What I claim as my invention, and desire to secure by Letters Patent, is—

1. In an apparatus for the bacterial treatment of sewage a supporting-frame, bearings in the frame, a carrier comprising an axle adapted to rotate in the bearings, spokes radiating from each end of the axle and at right angles thereto, and circular rims carried by the spokes, means for rotating the carrier perforated receptacles carried by the spokes and rims of the carrier, oxidizing material in the boxes, and sieves for closing the boxes.

2. In an apparatus for the bacterial treatment of sewage a supporting-frame, bearings in the frame, a carrier comprising an axle adapted to rotate in the bearings, spokes radiating from each end of the axle and at right angles thereto, and circular rims carried by the spokes, means for rotating the carrier, open bearings fixed to the spokes and rims perforated receptacles, trunnions on the receptacles adapted to rotatably and removably rest in said open bearings, oxidizing material in the boxes and sieves for closing the boxes.

In testimony whereof I have signed my name to this specification in the presence of two subscribing witnesses.

CHRISTOPH KREMER.

Witnesses:
MAURICE LITIENFELDE,
RACHMIEL LIESLER.